(12) United States Patent
Pan et al.

(10) Patent No.: US 11,462,130 B2
(45) Date of Patent: Oct. 4, 2022

(54) METHOD AND SYSTEM FOR AUTOMATICALLY GENERATING HOLE LOCATION MAP FOR GOLF COURSE

(71) Applicant: SHENZHEN JIAHESHUN INFORMATION AND TECHNOLOGY LTD., Shenzhen (CN)

(72) Inventors: Jianjia Pan, Shenzhen (CN); Jian Cheng, Shenzhen (CN); Xiaofeng Chen, Shenzhen (CN)

(73) Assignee: SHENZHEN JIAHESHUN INFORMATION AND TECHNOLOGY LTD, Shenzhen (CN)

(*) Notice: Subject to any disclaimer, the term of this patent is extended or adjusted under 35 U.S.C. 154(b) by 545 days.

(21) Appl. No.: 16/630,850

(22) PCT Filed: Jun. 19, 2017

(86) PCT No.: PCT/CN2017/088923
§ 371 (c)(1),
(2) Date: Jan. 13, 2020

(87) PCT Pub. No.: WO2018/166086
PCT Pub. Date: Sep. 20, 2018

(65) Prior Publication Data
US 2020/0258427 A1    Aug. 13, 2020

(30) Foreign Application Priority Data
Mar. 13, 2017  (CN) .......................... 201710147170.6

(51) Int. Cl.
G09B 29/00   (2006.01)
A63B 71/06   (2006.01)
(Continued)

(52) U.S. Cl.
CPC ............ *G09B 29/007* (2013.01); *A63B 71/06* (2013.01); *G01C 21/005* (2013.01); *A63B 2071/0691* (2013.01); *A63B 2102/32* (2015.10)

(58) Field of Classification Search
USPC ........................................................ 701/436
See application file for complete search history.

(56) References Cited

U.S. PATENT DOCUMENTS

| 2007/0060408 | A1* | 3/2007 | Schultz ................. A63F 13/812 |
|---|---|---|---|
| | | | 473/131 |
| 2009/0075761 | A1* | 3/2009 | Balardeta ............... A63B 57/00 |
| | | | 701/469 |

(Continued)

OTHER PUBLICATIONS

International Search Report issued in corresponding International application No. PCT/CN2017/088923, dated Sep. 27, 2017.

*Primary Examiner* — Pierre E Elisca

(57) ABSTRACT

The present invention discloses a method and a system for automatically generating a hole location map for golf course, relating to the field of the automatic measurement technology. The method includes the following steps: acquiring longitude and latitude data of all fairway center points or green center points, longitude and latitude data of all green front edge points, and longitude and latitude data of all current-date hole position points; calculating hole position data of respective current-date hole position points according to the longitude and latitude data of the current-date hole position point, the longitude and latitude data of the fairway center point or the green center point corresponding to the current-date hole position point and the longitude and latitude data of the green front edge point; and automatically generating a current-date hole location map for golf course according to the hole position data of the respective current-date hole position points.

10 Claims, 4 Drawing Sheets

(51) Int. Cl.
  *G01C 21/00*    (2006.01)
  *A63B 102/32*   (2015.01)

(56) References Cited

U.S. PATENT DOCUMENTS

| | | | | |
|---|---|---|---|---|
| 2009/0079625 A1* | 3/2009 | Denton | ............... | A63B 57/00 |
| | | | | 342/357.57 |
| 2009/0305820 A1* | 12/2009 | Denton | ............... | A63B 69/36 |
| | | | | 701/439 |
| 2012/0071277 A1* | 3/2012 | Denton | ............... | A63B 69/36 |
| | | | | 473/407 |
| 2018/0369665 A1* | 12/2018 | Baker | ............... | G06F 3/04847 |
| 2020/0282287 A1* | 9/2020 | Kim | ............... | H04W 4/029 |

* cited by examiner

| Hole | Position | |
|---|---|---|
| t | Y | \|X\| R |

FIG. 4

| Hole | Position | |
|---|---|---|
| 1 | Y | \|X\| R |
| 2 | Y | 0 |
| ... | ... | ... |
| t | 0 | \|X\| R |
| ... | ... | ... |
| T | Y | \|X\| L |

FIG. 5

METHOD AND SYSTEM FOR AUTOMATICALLY GENERATING HOLE LOCATION MAP FOR GOLF COURSE

TECHNICAL FIELD

The present invention relates to the field of the automatic measurement technology, and more particularly to a method and a system for automatically generating a hole location map for golf course.

BACKGROUND

In general, a golf course green hole position is manually moved on a green by a golf course worker every day or after a few days, and a deviation value of an exact hole position relative to a green front edge or a green center is measured manually and recorded, deviation values of all golf course holes are filled into a hole map position, so that a current-date hole location map for golf course is made, and a specific hole position is referenced by a player who plays golf on the golf course on that day.

However, such a method for manually generating the hole position map has the following disadvantages:
(1) low locating accuracy;
(2) high error rate of recording the deviation value and filling the hole position map; and
(3) time consumption and labor intensity.

SUMMARY

In view of the shortcomings of the prior art, the present invention provides a method and a system for automatically generating a hole location map for golf course. The method and the system solve the problem of high error rate in manually recording a deviation value and filling the hole position map, and greatly improve the position locating accuracy and the operating efficiency.

The technical solution adopted by the present invention to solve its technical problem is to provide a method for automatically generating a hole location map for golf course. The method includes the following steps:

S1. locating all fairway center points or green center points respectively, recording longitude and latitude data of the respective fairway centers or green center points, and uploading longitude and latitude data of the respective fairway centers or green center points to a database for storage;

S2. locating all green front edge points respectively, recording longitude and latitude data of the respective green front edge points, and uploading the longitude and latitude data of the respective front edge points to the database for storage;

S3. locating all current-date hole position points respectively, recording longitude and latitude data of the respective current-date hole position points, and uploading the longitude and latitude data of the respective current-date hole position points to the database for storage;

S4. loading the longitude and latitude data of all the fairway center points or green center points, the longitude and latitude data of all the green front edge points, and the longitude and latitude data of all the current-date hole position points in the database;

S5. calculating hole position data of the current-date hole position point according to the longitude and latitude data of the current-date hole position point and according to the longitude and latitude data of the fairway center point or the green center point corresponding to the current-date hole position point and the longitude and latitude data of the green front edge point;

S6. recording the hole position data of the current-date hole position point into a current-date golf course hole position chart;

S7. determining whether the calculation of all current-date hole position points is completed or not, if yes, performing a step S8, otherwise returning to perform the step S5;

S8. generating a current-date hole location map for golf course according to the current-date golf course hole position chart; and S9. saving and displaying the current-date hole location map for golf course.

Further, the method further includes, between the step S4 and the step S5:

assigning a current-date hole closest to the calculated current green front edge point to a current-date green hole according to the longitude and latitude data of the green front edge point and the longitude and latitude data of the current-date hole position point, such that respective current-date hole position points correspond to respective green front edge points and respective fairway center points or green center points.

Further, the step S5 includes:

S51. constructing a Cartesian coordinate system by using the calculated longitude and latitude data of the fairway center point or the green center point corresponding to the current-date hole position point and the longitude and latitude data of the green front edge point, wherein the Cartesian coordinate system can be constructed with the fairway center point and the green front edge point, or with the green center point and the green front edge point;

S52. calculating an included angle in which a positive direction of an X axis of a terrestrial longitude and latitude coordinate system is rotated to a positive direction of an Y axis of the Cartesian coordinate system constructed in the step S51 in a counterclockwise direction;

S53. calculating a coordinate of a deviation position of the current-date hole position point according to the included angle; and S54. calculating a deviation value of the current-date hole position point according to the coordinate of the deviation position, wherein the deviation value is a hole position data.

Further, the step S6 further includes: saving the current-date golf course hole position chart.

Further, the method includes, after the step S9:

querying the current-date or former-date golf course hole position chart;

displaying the current-date or former-date golf course hole position chart; and printing the current-date or former-date golf course hole position chart.

Another technical solution adopted by the present invention to solve its technical problem is to provide a system for automatically generating a hole location map for golf course.

The system includes:

a fairway center point acquisition module, which is configured to locate all fairway center points or green center points respectively, record longitude and latitude data of the respective fairway centers or green center points, and upload longitude and latitude data of the respective fairway centers or green center points to a database for storage;

a green front edge point acquisition module, which is configured to locate all green front edge points respectively, record longitude and latitude data of the respective green front edge points, and upload the longitude and latitude data of the respective front edge points to the database for storage;

a hole position point acquisition module, which is configured to locate all current-date hole position points respectively, record longitude and latitude data of the respective current-date hole position points, and upload the longitude and latitude data of the respective current-date hole position points to the database for storage;

a data loading module, which is configured to load the longitude and latitude data of all the fairway center points or green center points, the longitude and latitude data of all the green front edge points, and the longitude and latitude data of all the current-date hole position points in the database;

a calculation module, which is configured to calculate hole position data of the current-date hole position point according to the longitude and latitude data of the current-date hole position point and according to the longitude and latitude data of the fairway center point or the green center point corresponding to the current-date hole position point and the longitude and latitude data of the green front edge point;

a hole position data recording module, which is configured to record the hole position data of the current-date hole position point into a current-date golf course hole position chart;

a determination module, which is configured to determine whether the calculation of all current-date hole position points is completed or not, if yes, execute a hole position map generation module, otherwise return to execute the calculation module;

a hole position map generation module, which is configured to generate a current-date hole location map for golf course according to the current-date golf course hole position chart; and a saving and displaying module, which is configured to save and display the current-date hole location map for golf course.

Further, the system further includes, between the data loading module and the calculation module:

an assignment module, which is configured to assign a current-date hole closest to the calculated current green front edge point to a current-date green hole according to the longitude and latitude data of the green front edge point and the longitude and latitude data of the current-date hole position point, such that respective current-date hole position points correspond to respective green front edge points and respective fairway center points or green center points:

Further, the calculation module includes:

a coordinate system construction unit, which is configured to construct a Cartesian coordinate system by using the longitude and latitude data of the fairway center point or the green center point corresponding to the calculated current-date hole position point and the longitude and latitude data of the green front edge point, wherein the Cartesian coordinate system can be constructed with the fairway center point and the green front edge point, or with the green center point and the green front edge point;

an included angle calculation unit, which is configured to calculate an included angle in which a positive direction of an X axis of a terrestrial longitude and latitude coordinate system is rotated to a positive direction of an X axis of the Cartesian coordinate system constructed by the coordinate system construction unit in a counterclockwise direction;

a deviation position coordinate calculation unit, which is configured to calculate a coordinate of a deviation position of the current-date hole position point according to the included angle; and a deviation value calculation unit, which is configured to calculate a deviation value of the current-date hole position point according to the coordinate of the deviation position, wherein the deviation value is a hole position data.

Further, the hole position data recording module includes:

a chart saving unit, which is configured to save the current-date golf course hole position chart.

Further, the system includes, after the saving and displaying module:

a querying module, which is configured to query the current-date or former-date golf course hole position chart;

a displaying module, which is configured to display the current-date or former-date golf course hole position chart; and a printing module, which is configured to print the current-date or former-date golf course hole position chart.

The present invention has the beneficial effects as follows.

The method and the system for automatically generating the hole location map for golf course can automatically acquire the longitude and latitude data of all the fairway center points or green center points, the longitude and latitude data of all the green front edge points, and the longitude and latitude data of all the current-date hole position points; calculate the hole position data of the respective current-date hole position points according to the longitude and latitude data of the current-date hole position point, the longitude and latitude data of the fairway center point or the green center point corresponding to the current-date hole position point and the longitude and latitude data of the green front edge point; and automatically generate the current-date hole location map for golf course according to the hole position data of the respective current-date hole position points. The method and the system are high in automation degree without manually measuring the golf course hole position and manually filling the hole position map, thereby saving the time and effort, effectively preventing manual measurement errors from being large and deviation values from being incorrectly recorded and the hole position map from being incorrectly filled, and further greatly improving the position locating accuracy.

BRIEF DESCRIPTION OF THE DRAWINGS

FIG. 4 is a schematic diagram showing a line in a hole location map for golf course according to the present invention; and FIG. 5 is a schematic diagram showing a hole location map for golf course according to the present invention.

DESCRIPTION OF THE EMBODIMENTS

The present invention will be further described below with reference to accompanying drawings and embodiments.

Figure 1:
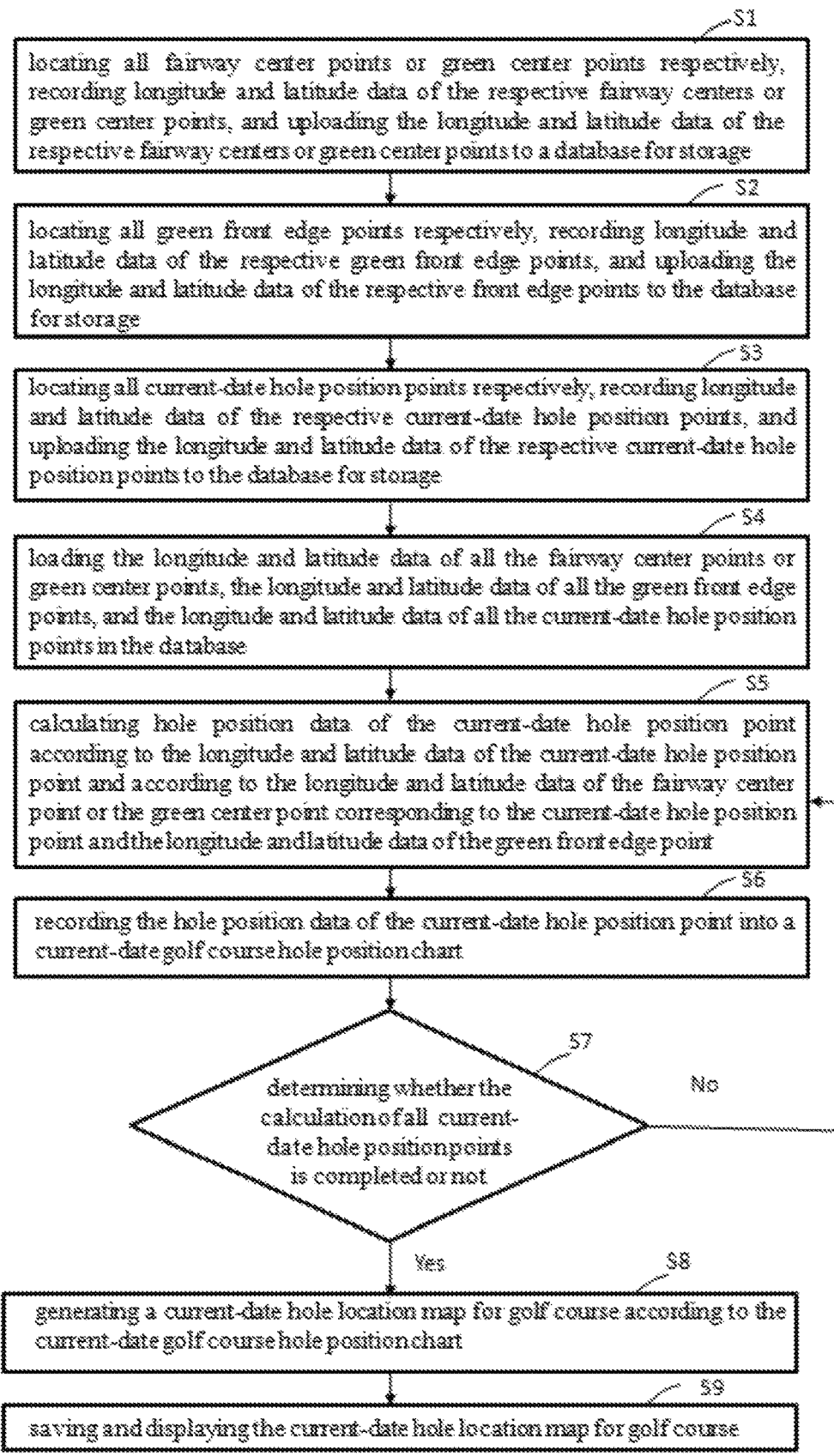
FIG. 1 is a flow diagram of illustrating a method for automatically generating a hole location map for golf course according to a first embodiment of the present invention.

As shown in FIG. 1, a first embodiment provides a method for automatically generating a hole location map for golf course, including the steps as follows.

S1, all fairway center points or green center points are located respectively, longitude and latitude data of the respective fairway centers or green center points are recorded, and the longitude and latitude data of the respective fairway centers or green center points are uploaded to a database for storage;

In this step, all the fairway center points or green center points are respectively located by a measuring and locating device. The measuring and locating device includes, but is not limited to, a GPS high-precision locating device, a satellite real-world locating map, a rangefinder and the like. Preferably, in this embodiment, all the fairway center points or green center points are respectively located by employing the GPS high-precision locating device. This step may be completed once provided that the terrain of the golf course has not changed significantly. This step may be performed once every several months. Because all the fairway center points or green center points are respectively located by employing the GPS high-precision locating device, the accuracy of locating the fairway center points or green center points is very high. This step provides a reference for the calculation of the hole location map for golf course.

If the calculation is based on fairway center points, the fairway center points should be firstly determined before this step. After a worker has determined the designated fairway center point, the GPS high-precision locating device may position the fairway center point provided that a locating button of the accompanied GPS high-precision locating device is pressed at the determined fairway center point. The longitude and latitude data of the fairway center point are acquired as below:

a current-date golf course is set as a $t^{th}$ golf course;

If the current-date golf course is a 3-hole course, a center of a blue tee of the $t^{th}$ golf course is designated as a fairway center point $A_{t(3)}$. A latitude and a longitude of the $A_{t(3)}$ are recorded as $P_t(x_{A3},y_{A3})$, wherein x represents a longitude of a current point and y represents a latitude of the current point.

If the current-date golf course is a 4-hole course, a point is found within a range in which a shot is played towards the green on the $t^{th}$ golf course as the fairway center point $A_{t(4)}$. Preferably, a middle position point on a fairway is designated as a fairway center point $A_{t(4)}$. A latitude and a longitude of the $A_{t(4)}$ are recorded as $P_t(x_{A4},y_{A4})$, wherein x represents a longitude of a current point and y represents a latitude of the current point.

If the current-date golf course is a 5-hole course, a point is found within the range in which a shot is played towards the green on the $t^{th}$ golf course as the fairway center point $A_{t(5)}$. Preferably, a middle position point on a fairway is designated as a fairway center point $A_{t(5)}$. A latitude and a longitude of the $A_{t(5)}$ are recorded as $P_t(x_{A5},y_{A5})$, wherein x represents a longitude of a current point and y represents a latitude of the current point.

S2, all green front edge points are located respectively, longitude and latitude data of the respective green front edge points are recorded, and the longitude and latitude data of the respective front edge points are uploaded to the database for storage.

In this step, all the green front edge points are respectively located by a measuring and locating device. The measuring and locating device includes, but is not limited to, a GPS high-precision locating device, a satellite real-world locating map, a rangefinder and the like. Preferably, in this embodiment, all the green front edge points are respectively located by employing the GPS high-precision locating device. This step may be completed once provided that the terrain of the golf course has not changed significantly. This step may be performed once every several months. Because all the green front edge points are respectively located by employing the GPS high-precision locating device, the accuracy of locating the green front edge points is very high. This step provides a reference for the calculation of the hole location map for golf course.

The GPS high-precision locating device may position the green front edge point provided that a worker only needs to press a locating button of the accompanied GPS high-precision locating device at the green front edge point, so that the longitude and latitude data of the green front edge point is acquired. A current-date hole is set as a $t^{th}$ hole, a green front edge point of the $t^{th}$ hole is set as an $E_t$ point, and a latitude and a longitude of the $E_t$ point are recorded as $P_t(x_E,y_E)$, x represents a longitude of a current point and y represents a latitude of the current point.

S3, all current-date hole position points are located respectively, longitude and latitude data of the respective current-date hole position points are recorded, and the longitude and latitude data of the respective current-date hole position points are uploaded to the database for storage.

In this step, all the current-date hole position points are respectively located by a measuring and locating device. The measuring and locating device includes, but is not limited to, a GPS high-precision locating device, a satellite real-world locating map, a rangefinder and the like. Preferably, in this embodiment, all the current-date hole position points are respectively located by employing the GPS high-precision locating device. Because all the current-date hole position points are respectively located by employing the GPS high-precision locating device, the accuracy of locating the current-date hole position points is very high.

The GPS high-precision locating device may position the current-date hole position point provided that a worker only needs to press a locating button of the accompanied GPS high-precision locating device at the current-date hole position point, so that the longitude and latitude data of the current-date hole position point is acquired. A current-date hole is set as a first hole, a current-date hole position point of the first hole is set as a $C_1$ point, and a latitude and a longitude of the $C_1$ point are recorded as $P_t(x_C,y_C)$, x represents a longitude of a current point and y represents a latitude of the current point.

S4, the longitude and latitude data of all the fairway center points or green center points, the longitude and latitude data of all the green front edge points, and the longitude and latitude data of all the current-date hole position points in the database are loaded.

Further, between the step S4 and the step S5, the method further includes: a current-date hole closest to the calculated current green front edge point is assigned to a current-date green hole according to the longitude and latitude data of the green front edge point and the longitude and latitude data of the current-date hole position point, such that respective current-date hole position points correspond to respective green front edge points and respective fairway center points or green center points.

T is set as the total number of all holes in the golf course. After the longitude and latitude data $\{P_t(x_E,y_E)|t=1, \ldots T\}$ of all the green front edge points and the longitude and latitude data $\{P_1(x_C,y_C)|1=1, \ldots T\}$ of the current-date hole position points of all holes are loaded, a relationship between the green front edge point and the current-date hole position is determined according to the distance between the $P_t(x_E,y_E)$ and the $P_1(x_C,y_C)$, that is, the $P_1(x_C,y_C)$ closest to the $P_t(x_E,y_E)$ point should be regarded as the current-date hole assigned to the $t^{th}$ green. A mathematical expression is described as below:

$$P_t(x_C,y_C)=P_t(x_{CC},y_{CC})$$

$$\sqrt{(x_{CC}-x_{E,t})^2+(y_{CC}-y_{E,t})^2}=\min(\sqrt{(x_{C,l}-x_{E,t})^2+(y_{C,l}-y_{E,t})^2})\ l\in\{1,2,\ldots T\}$$

wherein min represents a function of taking the smallest value. By means of the above method, the current-date hole $P_1(x_C,y_C)$ is assigned to the corresponding green, with a position of $P_t(x_C, y_C)$.

S5, hole position data of the current-date hole position point is calculated according to the longitude and latitude data of the current-date hole position point and according to the longitude and latitude data of the fairway center point or the green center point corresponding to the current-date hole position point and the longitude and latitude data of the green front edge point.

In this step, a method for calculating the hole position data of the current-date hole position point includes, but is not limited to, a coordinate conversion calculation method, a direct distance calculation method, an angle calculation method, and the like. Preferably, the coordinate conversion calculation method is employed in this embodiment. The coordinate conversion calculation method includes the steps as follows.

S51, a Cartesian coordinate system is constructed by using the calculated longitude and latitude data of the fairway center point or the green center point corresponding to the current-date hole position point and the longitude and latitude data of the green front edge point, wherein the Cartesian coordinate system may be constructed with the fairway center point and the green front edge point, or with the green center point and the green front edge point.

Figure 2:
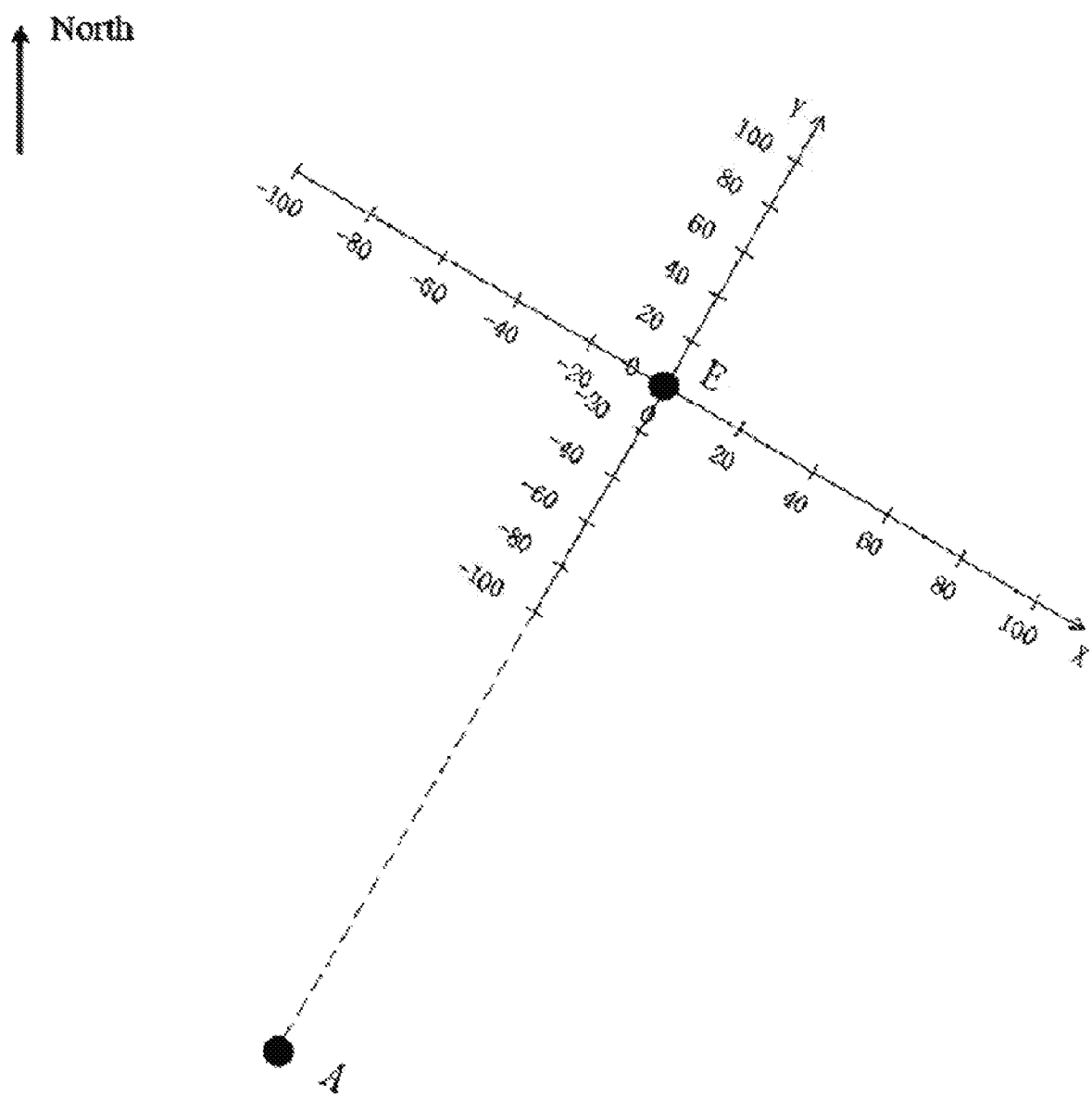
FIG. 2 is a diagram showing a Cartesian coordinate system constructed by using a fairway center point and a green front edge point according to the present invention.

As shown in FIG. 2, with the green front edge point E as the origin, a line is made from the designated fairway center point A to the green front edge point E to form a Y axis, and a direction from A to E is taken as a positive direction of the Y axis. A straight line is made from the point E to form an X axis perpendicular to the Y axis, and a direction in which the positive direction of the Y axis is rotated by $\pi/2$ in a clockwise direction is taken as a positive direction of the X axis. Accordingly, an AE Cartesian coordinate system with the E point as the origin is constructed.

S52, an included angle in which a positive direction of an X axis of a terrestrial longitude and latitude coordinate system is rotated to a positive direction of an X axis of the Cartesian coordinate system constructed in the step S51 in a counterclockwise direction is calculated.

Figure 3:
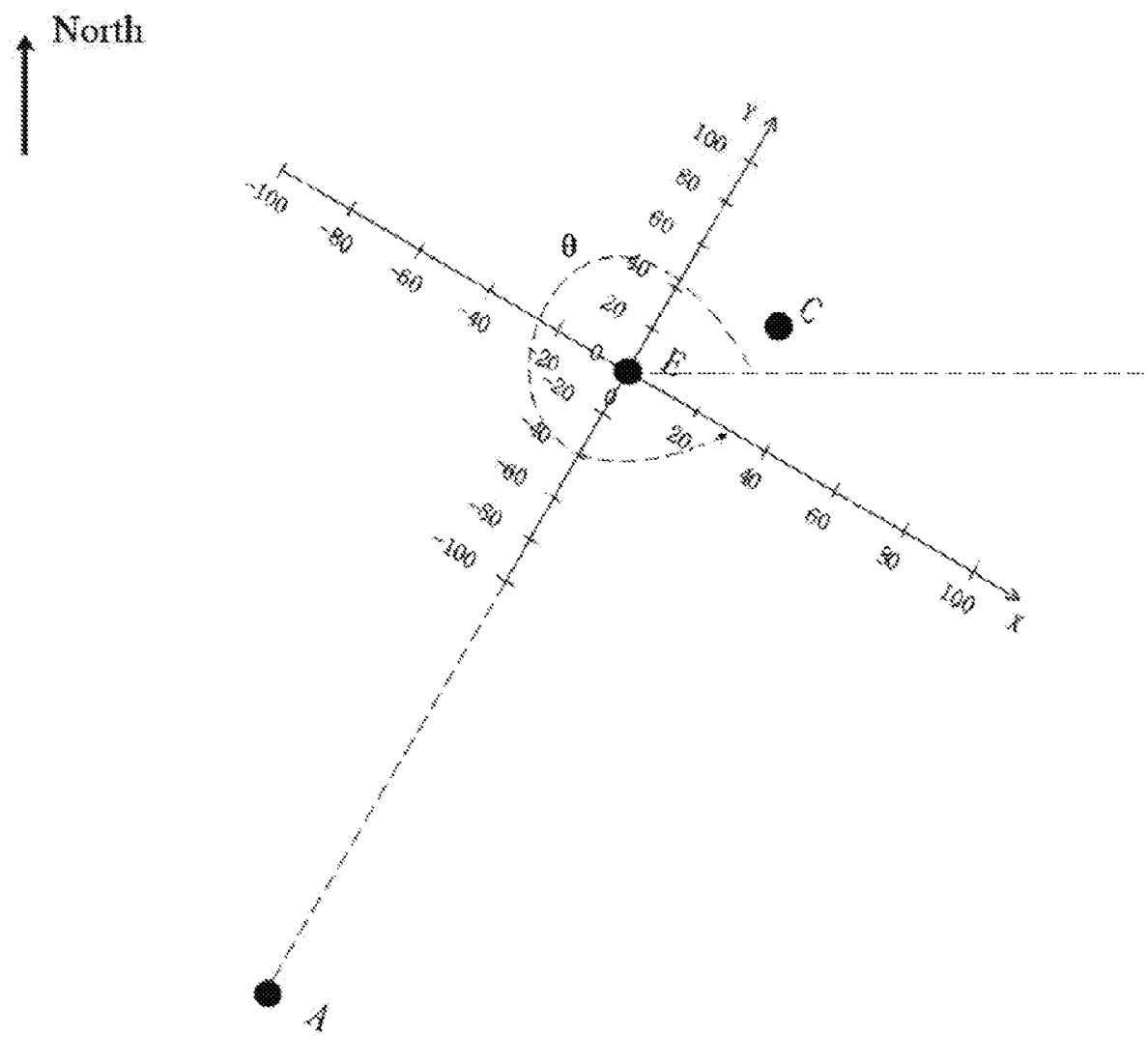
FIG. 3 is a schematic diagram showing a position relationship between a terrestrial longitude and latitude coordinate system and the constructed Cartesian coordinate system according to the present invention.

As shown in FIG. 3, a north direction is taken as a positive direction of a Y axis of the terrestrial longitude and latitude coordinate system, and an included angle $\theta$ in which a positive direction of an X axis of a terrestrial longitude and latitude coordinate system is rotated to a positive direction of an X axis of an AE Cartesian coordinate system in a counterclockwise direction is obtained from longitude and latitude coordinates of the A point and the E point as below.

if $x_E-x_A>0$ and $y_E-y_A>0$, then $$\theta = 2\pi - \text{act tan}\left(\frac{x_E - x_A}{y_E - y_A}\right);$$

if $x_E-x_A<0$ and $y_E-y_A>0$; then $$\theta = -\text{act tan}\left(\frac{x_E - x_A}{y_E - y_A}\right);$$

if $y_E-y_A<0$, then $$\theta = \pi - \text{act tan}\left(\frac{x_E - x_A}{y_E - y_A}\right);$$

if $x_E-x_A=0$ and $y_E-y_A\geq0$, then $\theta=0$;

if $x_E-x_A=0$ and $y_E-y_A<0$, then $\theta=\pi$;

if $y_E-y_A=0$ and $x_E-x_A>0$, then $\theta=\frac{3}{2}\pi$; and if $y_E-y_A=0$ and $x_E-x_A<0$, then $\theta=\frac{1}{2}\pi$.

S53, a coordinate of a deviation position of the current-date hole position point is calculated according to the included angle.

That is, the coordinate $P(x_m,y_m)$ of the deviation position of the current-date hole position C point at the current $t^{th}$ hole is described as below:

$$x_m=(x_C-x_E)\cos\theta+(y_C-y_E)\sin\theta;\ \text{and}$$

$$y_m=-(x_C-x_E)\sin\theta+(y_C-y_E)\cos\theta.$$

S54, a deviation value of the current-date hole position point is calculated according to the coordinate of the deviation position, wherein the deviation value is a hole position data.

That is, a deviation value (X,Y) of the current-date hole position C point of the current $t^{th}$ hole is described as below:

$$X=x_mT_x;\ \text{and}$$

$$Y=y_mT_y.$$

$T_x$ represents an earth surface distance (in yards) corresponding to each longitude in a case of the current longitude and latitude, and $T_y$ represents an earth surface distance (in yards) corresponding to each latitude in a case of the current longitude and latitude.

S6, the hole position data of the current-date hole position point is recorded into a current-date golf course hole position chart.

The step S6 further includes: a current-date golf course hole position chart is saved.

Because a point E serves as the origin of a coordinate axis, there must be $Y\geq0$.

If $X>0$, an absolute value $|X|$ is filled into the right side of a position column and recorded as $|X|R$.

If $X<0$, the absolute value $|X|$ is filled into the right side of the position column and recorded as $|X|L$.

If $X=0$, 0 is filled into the right side of the position column.

Y value is filled into the left side of the position column, as shown in FIG. 4. After the value is filled into the current-date golf course hole position chart, the current-date golf course hole position chart is saved.

S7, it is determined whether the calculation of all current-date hole position points is completed or not, if yes, the method performs a step S8, otherwise returns to perform the step S5.

In this embodiment, all the current-date hole position points are calculated one by one, and the hole position data is recorded into the current-date golf course hole position chart after the hole position data of one current-date hole position point is calculated. Accordingly, the steps S5 to S6 are performed on all the holes repeatedly until all the current-date hole position points are calculated.

S8, a current-date hole location map for golf course is generated according to the current-date golf course hole position chart.

When all the current-date hole position points are calculated, and after the hole position data of all the current-date hole position points are recorded in the current-date golf course hole position chart, the system automatically generates the current-date hole location map for golf course, wherein the current-date golf course hole position chart is shown in FIG. 5.

S9, the current-date hole location map for golf course is saved and displayed.

Further, after the step S9, the method includes:

the current-date or former-date golf course hole position chart is queried;

the current-date or former-date golf course hole position chart is displayed; and the current-date or former-date golf course hole position chart is printed.

A customer may query the current-date or former-date golf course hole position chart at any time. After receiving a query instruction, the system automatically queries and loads the hole location map for golf course, which is entered by the customer, of a specified date, and outputs the hole location map for golf course, which is entered by the customer, of the specified date to a display screen for the customer to watch or prints the hole location map for golf course of the specified date as a print for the customer to use.

In this embodiment, the longitude and latitude data of all the fairway center points or green center points, the longitude and latitude data of all the green front edge points, and the longitude and latitude data of all the current-date hole position points are acquired; the hole position data of the respective current-date hole position points is calculated according to the longitude and latitude data of the current-date hole position point, the longitude and latitude data of the fairway center point or the green center point corresponding to the current-date hole position point and the longitude and latitude data of the green front edge point; and the current-date hole location map for golf course is automatically generated according to the hole position data of the respective current-date hole position points. The method is high in automation degree without manually measuring the golf course hole position and manually filling the hole position map, thereby saving the time and effort, effectively preventing manual measurement errors from being large and deviation values from being incorrectly recorded and the hole position map from being incorrectly filled, and further, the position locating accuracy is greatly improved.

A second embodiment provides a system for automatically generating a hole location map for golf course, including a module 1, a module 2, a module 3, a module 4, a module 5, a module 6, a module 7, a module 8 and a module 9.

The module 1, that is, a fairway center point acquisition module, is configured to position all fairway center points or green center points respectively, record longitude and latitude data of the respective fairway centers or green center points, and upload the longitude and latitude data of the respective fairway centers or green center points to a database for storage.

In this module, all the fairway center points or green center points are respectively located by a measuring and locating device. The measuring and locating device includes, but is not limited to, a GPS high-precision locating device, a satellite real-world locating map, a rangefinder and the like. Preferably, in this embodiment, all the fairway center points or green center points are respectively located by employing the GPS high-precision locating device. This module may be completed once provided that the terrain of the golf course has not changed significantly. This module may be performed once every several months. Because all the fairway center points or green center points are respectively located by employing the GPS high-precision locating device, the accuracy of locating the fairway center points or green center points is very high. This module provides a reference for the calculation of the hole location map for golf course.

If the calculation is based on fairway center points, the fairway center points should be firstly determined before this module. After a worker has determined the designated fairway center point, the GPS high-precision locating device may position the fairway center point provided that a locating button of the accompanied UPS high-precision locating device is pressed at the determined fairway center point. The longitude and latitude data of the fairway center point are acquired as below:

a current-date golf course is set as a $t^{th}$ golf course;

if the current-date golf course is a 3-hole course, a center of a blue tee of the $t^{th}$ golf course is designated as a fairway center point $A_{t(3)}$. A latitude and a longitude of the $A_{t(3)}$ are recorded as $P_t(x_{43},y_{43})$, wherein x represents a longitude of a current point and y represents a latitude of the current point.

If the current-date golf course is a 4-hole course, a point is found within a range in which a shot is played towards the green on the $t^{th}$ golf course as the fairway center point $A_{t(4)}$. Preferably, a middle position point on a fairway is designated as a fairway center point $A_{t(4)}$. A latitude and a longitude of the $A_{1(4)}$ are recorded as $P_t(x_{44},y_{44})$, wherein x represents a longitude of a current point and y represents a latitude of the current point.

If the current-date golf course is a 5-hole course, a point is found within the range in which a shot is played towards the green on the $t^{th}$ golf course as the fairway center point $A_{t(5)}$. Preferably, a middle position point on a fairway is designated as a fairway center point At(5). A latitude and a longitude of the $A_{t(5)}$ are recorded as $P_t(x_{45},y_{45})$, wherein x represents a longitude of a current point and y represents a latitude of the current point.

The module 2, that is, a green front edge point acquisition module, is configured to locate all green front edge points respectively, record longitude and latitude data of the respective green front edge points, and upload the longitude and latitude data of the respective front edge points to the database for storage.

In this module, all the green front edge points are respectively located by a measuring and locating device. The measuring and locating device includes, but is not limited to, a GPS high-precision locating device, a satellite real-world locating map, a rangefinder and the like. Preferably, in this embodiment, all the green front edge points are respectively located by employing the GPS high-precision locating device. This module may be completed once provided that the terrain of the golf course has not changed significantly. This module may be performed once every several months. Because all the green front edge points are respectively located by employing the GPS high-precision locating device, the accuracy of locating the green front edge points is very high. This module provides a reference for the calculation of the hole location map for golf course.

The GPS high-precision locating device may position the green front edge point provided that a worker only needs to press a locating button of the accompanied GPS high-precision locating device at the green front edge point, so that the longitude and latitude data of the green front edge point is acquired. A current-date hole is set as a $t^{th}$ hole, a green front edge point of the $t^{th}$ hole is set as an $E_t$ point, and a latitude and a longitude of the $E_t$ point are recorded as $P_t(x_E,y_E)$, x represents a longitude of a current point and y represents a latitude of the current point.

The module 3, that is, a hole position point acquisition module is configured to locate all current-date hole position points respectively, record longitude and latitude data of the respective current-date hole position points, and upload the longitude and latitude data of the respective current-date hole position points to the database for storage.

In this module, all the current-date hole position points are respectively located by a measuring and locating device. The measuring and locating device includes, but is not limited to, a GPS high-precision locating device, a satellite real-world locating map, a rangefinder and the like. Preferably, in this embodiment, all the current-date hole position points are respectively located by employing the GPS high-precision locating device. Because all the current-date hole position points are respectively located by employing the GPS high-precision locating device, the accuracy of locating the current-date hole position points is very high.

The GPS high-precision locating device may position the current-date hole position point provided that a worker only needs to press a locating button of the accompanied GPS high-precision locating device at the current-date hole position point, so that the longitude and latitude data of the current-date hole position point is acquired. A current-date hole is set as a first hole, a current-date hole position point of the first hole is set as a $C_1$ point, and a latitude and a longitude of the $C_1$ point are recorded as $P_t(x_C,y_C)$, x represents a longitude of a current point and y represents a latitude of the current point.

The module 4, that is, a data loading module, is configured to load the longitude and latitude data of all the fairway center points or green center points, the longitude and latitude data of all the green front edge points, and the longitude and latitude data of all the current-date hole position points in the database.

Further, after the module 4 and before a module 5, the system further includes an assignment module, which is configured to assign a current-date hole closest to the calculated current green front edge point to a current-date green hole according to the longitude and latitude data of the green front edge point and the longitude and latitude data of the current-date hole position point, such that respective current-date hole position points correspond to respective green front edge points and respective fairway center points or green center points.

T is set as the total number of all holes in the golf course. After the longitude and latitude data $\{P_t(x_E,y_E)|t=1, \ldots T\}$ of all the green front edge points and the longitude and latitude data $\{P_t(x_C,y_C)|l=1, \ldots T\}$ of the current-date hole position points of all holes are loaded, a relationship between the green front edge point and the current-date hole position is determined according to the distance between the $P_t(x_E,y_E)$ and the $P_1(x_C,y_C)$, that is, the $P_1(x_C,y_C)$ closest to the $P_t(x_E,y_E)$ point should be regarded as the current-date hole assigned to the $t^{th}$ green. A mathematical expression is described as below:

$$P_t(x_C,y_C)=P_t(x_{CC},y_{CC})$$
$$\sqrt{(x_{CC}-x_{E,t})^2+(y_{CC}-y_{E,t})^2}=\min(\sqrt{(x_{C,l}-x_{E,t})^2+(y_{C,l}-y_{E,t})^2}) \; l \in \{1,2,\ldots T\}$$

wherein min represents a function of taking the smallest value. By means of the above method, the current-date hole $P_1(x_C,y_C)$ is assigned to the corresponding green, with a position of $P_t(x_C,y_C)$.

The module 5, that is, a calculation module is configured to calculate the hole position data of the current-date hole position point according to the longitude and latitude data of the current-date hole position point, and the longitude and latitude data of the fairway center point or the green center point corresponding to the current-date hole position point and the longitude and latitude data of the green front edge point.

In this module, a method for calculating the hole position data of the current-date hole position point includes, but is not limited to, a coordinate conversion calculation method, a direct distance calculation method, an angle calculation method, and the like. Preferably, a coordinate conversion calculation method is employed in this embodiment. The module 5 includes a unit 51, a unit 52, a unit 53 and a unit 54.

The unit 51, that is, a coordinate system construction unit is configured to construct a Cartesian coordinate system by using the calculated longitude and latitude data of the fairway center point or the green center point corresponding to the current-date hole position point and the longitude and latitude data of the green front edge point, wherein the Cartesian coordinate system may be constructed with the fairway center point and the green front edge point, or with the green center point and the green front edge point.

As shown in FIG. 2, with the green front edge point E as the origin, a line is made from the designated fairway center point A to the green front edge point E to form a Y axis, and a direction from A to E is taken as a positive direction of the Y axis, A straight line is made from the point E to form an X axis perpendicular to the Y axis, and a direction in which the positive direction of the Y axis is rotated by $\pi/2$ in a clockwise direction is taken as a p s e direction of the X axis. Accordingly, an AE Cartesian coordinate system with the E point as the origin is constructed.

The unit 52, that is, an included angle calculation unit is configured to calculate an included angle in which a positive direction of an X axis of a terrestrial longitude and latitude coordinate system is rotated to a positive direction of an X axis of the Cartesian coordinate system constructed by the unit 51 in a counterclockwise direction As shown in FIG. 3, a north direction is taken as a positive direction of a Y axis of the terrestrial longitude and latitude coordinate system, and an included angle θ in which a positive direction of an X axis of a terrestrial longitude and latitude coordinate system is rotated to a positive direction of an X axis of an AE Cartesian coordinate system in a counterclockwise direction is obtained from longitude and latitude coordinates of the A point and the E point as below.

If $x_E-x_A>0$ and $y_E-y_A>0$, then $$\theta = 2\pi - \mathrm{act}\,\tan\left(\frac{x_E - x_A}{y_E - y_A}\right).$$

If $x_E-x_A<0$ and $y_E-y_A>0$, then $$\theta = -\operatorname{act}\tan\left(\frac{x_E-x_A}{y_E-y_A}\right).$$

If $y_E-y_A<0$, then $$\theta = \pi - \operatorname{act}\tan\left(\frac{x_E-x_A}{y_E-y_A}\right).$$

If $x_E-x_A=0$ and $y_E-y_A\geq 0$, then $\theta=0$.

If $x_E-x_A=0$ and $y_E-y_A<0$, then $\theta=\pi$.

If $y_E-y_A=0$ and $x_E-x_A>0$, then $\theta=\frac{2}{3}\pi$.

If $y_E-y_A=0$ and $x_E-x_A<0$, then $\theta=\frac{1}{2}\pi$.

The unit 53, that is, a deviation position coordinate calculation unit is configured to calculate a coordinate of a deviation position of the current-date hole position point according to the included angle.

That is, the coordinate $P(x_m, y_m)$ of the deviation position of the current-date hole position C point of the current $t^{th}$ hole is described as below:

$$x_m=(x_C-x_E)\cos\theta+(y_C-y_E)\sin\theta;\text{ and}$$

$$y_m=-(x_C-x_E)\sin\theta+(y_C-y_E)\cos\theta.$$

The unit 54, that is, a deviation value calculation unit, is configured to calculate a deviation value of the current-date hole position point according to the coordinate of the deviation position, wherein the deviation value is a hole position data.

That is, a deviation value (X,Y) of the current-date hole position C point of the current $t^{th}$ hole is described as below:

$$X=x_m T_x;$$

$$Y=y_m T_y.$$

$T_x$ represents an earth surface distance (in yards) corresponding to each longitude in a case of the current longitude and latitude, and $T_y$ represents an earth surface distance (in yards) corresponding to each latitude in a case of the current longitude and latitude.

The module 6, that is, a hole position data recording module is configured to record the hole position data of the current-date hole position point into a current-date golf course hole position chart.

This module further includes a chart saving unit, which is configured to save a current-date golf course hole position chart.

Because a point E serves as the origin of a coordinate axis, there must be Y≥0.

If X>0, an absolute value |X| is filled into the right side of a position column and recorded as |X|R.

If X<0, the absolute value |X| is filled into the right side of the position column and recorded as |X|L.

If X=0, 0 is filled into the right side of the position column.

Y value is filled into the left side of the position column, as shown in FIG. 4. After the value is filled into the current-date golf course hole position chart, the current-date golf course hole position chart is saved.

The module 7, that is, a determination module is configured to determine whether the calculation of all current-date hole position points is completed or not, if yes, execute the module 8, otherwise return to execute the module 5.

In this embodiment, all the current-date hole position points are calculated one by one, and the hole position data is recorded into the current-date golf course hole position chart after the hole position data of one current-date hole position point is calculated. Accordingly, the steps S5 to S6 are performed on all the holes repeatedly until all the current-date hole position points are calculated.

The module 8, that is, a hole position map generation module is configured to generate a current-date hole location map for golf course according to the current-date golf course hole position chart.

When all the current-date hole position points are calculated, and after the hole position data of all the current-date hole position points are recorded into the current-date golf course hole position chart, the system automatically generates the current-date hole location map for golf course, wherein the current-date golf course hole position chart is shown in FIG. 5.

The module 9, that is, a saving and displaying module, is configured to save and display the current-date hole location map for golf course.

Further, after the module 9, the system includes:

a querying module, which is configured to query the current-date or former-date golf course hole position chart;

a displaying module, which is configured to display the current-date or former-date golf course hole position chart; and a printing module, which is configured to print the current-date or former-date golf course hole position chart.

A customer may query the current-date or former-date golf course hole position chart at any time. After receiving a query instruction, the system automatically queries and loads the hole location map for golf course, which is entered by the customer, of a specified date, and outputs the hole location map for golf course, which is entered by the customer, of the specified date to a display screen for the customer to watch or prints the hole location map for golf course of the specified date as a print for the customer to use.

In this embodiment, the longitude and latitude data of all the fairway center points or green center points, the longitude and latitude data of all the green front edge points, and the longitude and latitude data of all the current-date hole position points are acquired; the hole position data of the respective current-date hole position points is calculated according to the longitude and latitude data of the current-date hole position point, the longitude and latitude data of the fairway center point or the green center point corresponding to the current-date hole position point and the longitude and latitude data of the green front edge point; and the current-date hole location map for golf course is automatically generated according to the hole position data of the respective current-date hole position points. The system is high in automation degree without manually measuring the golf course hole position and manually filling the hole position map, thereby saving the time and effort, effectively preventing manual measurement errors from being large and deviation values from being incorrectly recorded and the hole position map from being incorrectly filled, and further, the position locating accuracy is greatly improved.

The foregoing is only illustrative of preferred embodiments of the present invention. The present invention is not limited to the above embodiments. It should be understood that further improvements and changes that are directly derived or conceived by those skilled in the art without departing from the basic concept of the present invention should be considered to be included in the protective scope of the present invention.

What is claimed is:

1. A method for automatically generating a hole location map for golf course, comprising the steps of:
locating all fairway center points or green center points respectively, recording longitude and latitude data of the respective fairway centers or green center points, and uploading the longitude and latitude data of the respective fairway centers or green center points to a database for storage;
locating all green front edge points respectively, recording longitude and latitude data of the respective green front edge points, and uploading the longitude and latitude data of the respective front edge points to the database for storage;
locating all current-date hole position points respectively, recording longitude and latitude data of the respective current-date hole position points, and uploading the longitude and latitude data of the respective current-date hole position points to the database for storage;
loading the longitude and latitude data of all the fairway center points or green center points, the longitude and latitude data of all the green front edge points, and the longitude and latitude data of all the current-date hole position points in the database;
calculating hole position data of the current-date hole position point according to the calculated longitude and latitude data of the current-date hole position point and according to the longitude and latitude data of the fairway center point or the green center point corresponding to the current-date hole position point and the longitude and latitude data of the green front edge point;
recording the hole position data of the current-date hole position point into a current-date golf course hole position chart;
determining whether the calculation of all current-date hole position points is completed or not, if yes, proceeding to the next step, otherwise returning to the step of calculating hole position data of the current-date hole position point;
generating a current-date hole location map for golf course according to the current-date golf course hole position chart; and
saving and displaying the current-date hole location map for golf course.

2. The method for automatically generating a hole location map for golf course according to claim 1, wherein the method further comprises, between the step of loading the longitude and latitude data of all the fairway center points or green center points, the longitude and latitude data of all the green front edge points, and the longitude and latitude data of all the current-date hole position points in the database and the step of calculating hole position data of the current-date hole position point:
assigning a current-date hole closest to the calculated current green front edge point to a current-date green hole according to the longitude and latitude data of the green front edge point and the longitude and latitude data of the current-date hole position point, such that respective current-date hole position points correspond to respective green front edge points and respective fairway center points or green center points.

3. The method for automatically generating a hole location map for golf course according to claim 1, wherein the step of calculating hole position data of the current-date hole position point comprises:
constructing a Cartesian coordinate system by using the calculated longitude and latitude data of the fairway center point or the green center point corresponding to the current-date hole position point and the longitude and latitude data of the green front edge point;
calculating an included angle in which a positive direction of an X axis of a terrestrial longitude and latitude coordinate system is rotated to a positive direction of an X axis of the Cartesian coordinate system constructed in the step of constructing the Cartesian coordinate system in a counterclockwise direction;
calculating a coordinate of a deviation position of the current-date hole position point according to the included angle; and
calculating a deviation value of the current-date hole position point according to the coordinate of the deviation position, wherein the deviation value is a hole position data.

4. The method for automatically generating a hole location map for golf course according to claim 1, wherein the step of recording the hole position data of the current-date hole position point into the current-date golf course hole position chart further comprises:
saving the current-date golf course hole position chart.

5. The method for automatically generating a hole location map for golf course according to claim 1, wherein the method further comprises, after the step of saving and displaying the current-date hole location map for golf course:
querying the current-date or former-date golf course hole position chart;
displaying the current-date or former-date golf course hole position chart; and
printing the current-date or former-date golf course hole position chart.

6. A system for automatically generating a hole location map for golf course, comprising:
a fairway center point acquisition module, which is configured to locate all fairway center points or green center points respectively, record longitude and latitude data of the respective fairway centers or green center points, and upload the longitude and latitude data of the respective fairway centers or green center points to a database for storage;
a green front edge point acquisition module, which is configured to locate all green front edge points respectively, record longitude and latitude data of the respective green front edge points, and upload the longitude and latitude data of the respective front edge points to the database for storage;
a hole position point acquisition module, which is configured to locate all current-date hole position points respectively, record longitude and latitude data of the respective current-date hole position points, and upload the longitude and latitude data of the respective current-date hole position points to the database for storage;
a data loading module, which is configured to load the longitude and latitude data of all the fairway center points or green center points, the longitude and latitude data of all the green front edge points, and the longitude and latitude data of all the current-date hole position points in the database;

a calculation module, which is configured to calculate hole position data of the current-date hole position point according to the calculated longitude and latitude data of the current-date hole position point and according to the longitude and latitude data of the fairway center point or the green center point corresponding to the current-date hole position point and the longitude and latitude data of the green front edge point;

a hole position data recording module, which is configured to record the hole position data of the current-date hole position point into a current-date golf course hole position chart;

a determination module, which is configured to determine whether the calculation of all current-date hole position points is completed or not, if yes, execute a hole position map generation module, otherwise return to execute the calculation module;

a hole position map generation module, which is configured to generate a current-date hole location map for golf course according to the current-date golf course hole position chart; and a saving and displaying module, which is configured to save and display the current-date hole location map for golf course.

7. The system for automatically generating a hole location map for golf course according to claim 6, wherein between the data loading module and the calculation module, the system further comprises:

an assignment module, which is configured to assign a current-date hole closest to the calculated current green front edge point to a current-date green hole according to the longitude and latitude data of the green front edge point and the longitude and latitude data of the current-date hole position point, such that respective current-date hole position points correspond to respective green front edge points and respective fairway center points or green center points.

8. The system for automatically generating a hole location map for golf course according to claim 6, wherein the calculation module comprises:

a coordinate system construction unit, which is configured to construct a Cartesian coordinate system by using the calculated longitude and latitude data of the fairway center point or the green center point corresponding to the current-date hole position point and the longitude and latitude data of the green front edge point;

an included angle calculation unit, which is configured to calculate an included angle in which a positive direction of an X axis of a terrestrial longitude and latitude coordinate system is rotated to a positive direction of an X axis of the Cartesian coordinate system constructed by the coordinate system construction unit in a counterclockwise direction;

a deviation position coordinate calculation unit, which is configured to calculate a coordinate of a deviation position of the current-date hole position point according to the included angle; and a deviation value calculation unit, which is configured to calculate a deviation value of the current-date hole position point according to the coordinate of the deviation position, wherein the deviation value is a hole position data.

9. The system for automatically generating a hole location map for golf course according to claim 6, wherein the hole position data recording module comprises:

a chart saving unit, which is configured to save the current-date golf course hole position chart.

10. The system for automatically generating a hole location map for golf course according to claim 6, wherein after the saving and displaying module, the system comprises:

a querying module, which is configured to query the current-date or former-date golf course hole position chart;

a displaying module, which is configured to display the current-date or former-date golf course hole position chart; and a printing module, which is configured to print the current-date or former-date golf course hole position chart.

* * * * *